W. V. TURNER.
FLUID PRESSURE CONTROL APPARATUS.
APPLICATION FILED JULY 3, 1907.
1,025,340.
Patented May 7, 1912.
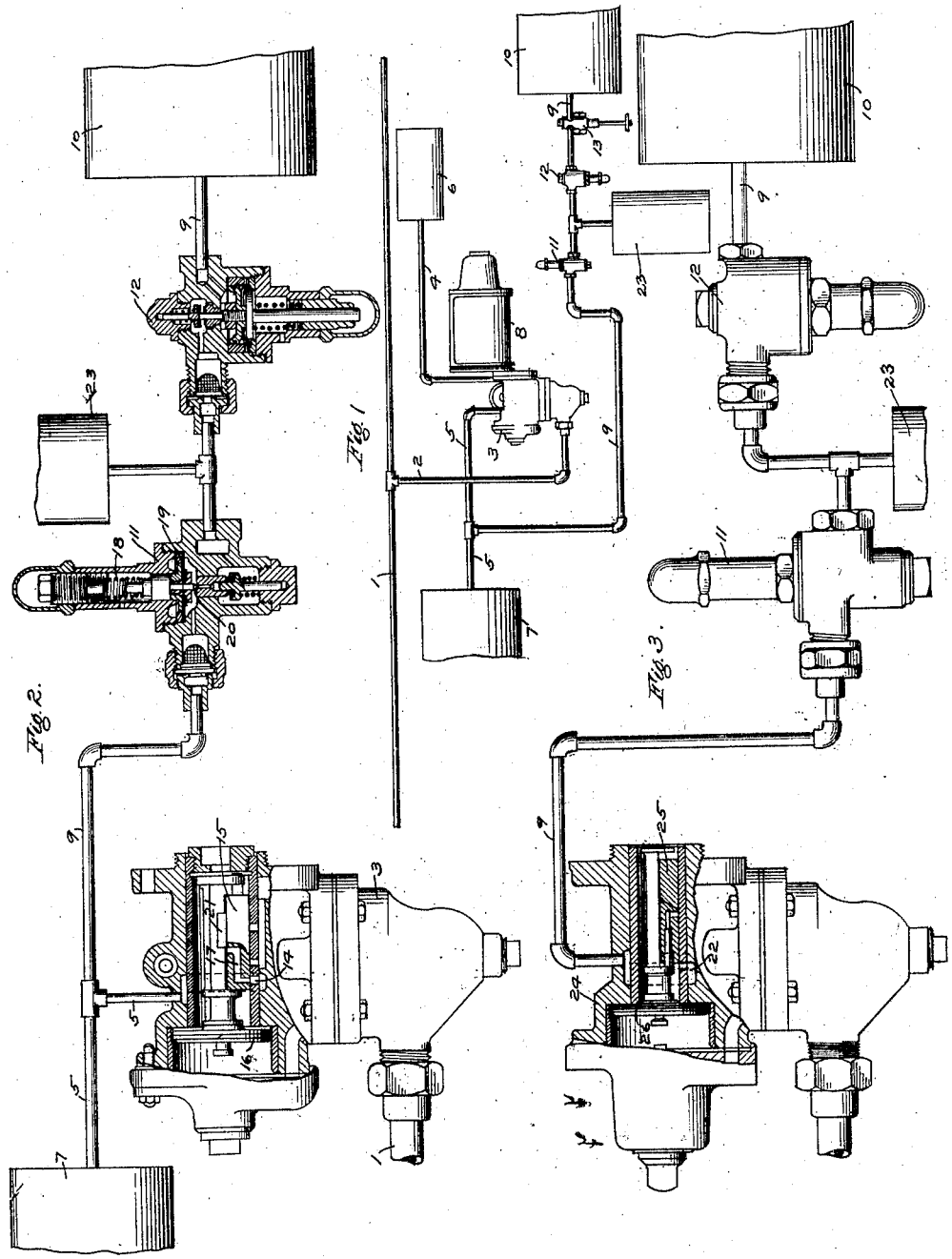
WITNESSES
INVENTOR
Walter V. Turner
by E. Wright
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE-CONTROL APPARATUS.

1,025,340.  Specification of Letters Patent.  Patented May 7, 1912.

Application filed July 3, 1907. Serial No. 382,010.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure-Control Apparatus, of which the following is a specification.

This invention relates to apparatus adapted to control the supply of fluid under pressure from fluid pressure brake systems to extraneous apparatus requiring compressed air for various purposes. As well known examples of such apparatus, water raising apparatus for supplying water under pressure for various purposes on cars, may be mentioned, and also certain apparatus for carbureting and supplying illuminating gas for car lighting purposes.

It is usual, with apparatus of the above nature, to obtain the supply of compressed air from the auxiliary reservoir on the car, and it has been the practice, in order to protect the auxiliary reservoir pressure for braking purposes, to interpose, in the supply pipe to the extraneous apparatus, a cut out valve mechanism, adapted to cut off communication between the auxiliary reservoir and the extraneous apparatus when the reservoir pressure is a certain amount less than standard train pipe pressure carried in the system, for example, the valve mechanism may be adjusted to close at 60 pounds, in connection with a standard pressure of 70 pounds. Thus the fluid under pressure in the auxiliary reservoir is not effected by flow to the extraneous apparatus until the pressure exceeds 60 pounds, which pressure, ordinarily, is sufficient for braking purposes.

In many air brake equipments now in use two working train pipe pressures are available, one the usual standard degree, 70 pounds, and the other, say 110 pounds, for high speed braking. It is evident that, when the high speed pressure of 110 pounds is used, the cut out valve mechanism above referred to, being adjusted to 60 pounds, such valve will remain open above 60 pounds, so that, there are times when the supply reservoir for the extraneous apparatus is charging up to the higher degree of pressure. Under these circumstances, should a reduction in train pipe pressure be made, in order to effect an application of the brakes, the reservoir pressure may be so low, as compared with the reduced train pipe pressure that the triple piston might not make the full traverse to application position, or if the piston does move to application position, the continued drawing off of fluid from the auxiliary reservoir by the extraneous apparatus may cause the piston to return to release position and release the brakes.

The principal object of my invention is, then, to obviate the above mentioned difficulties, for which purpose I provide means adapted to automatically control the communication from the auxiliary reservoir to the extraneous apparatus.

In the accompanying drawings; Figure 1 is a diagrammatic view of one form of car air brake equipment, in connection with a water raising apparatus, with my improvements applied; Fig. 2 an enlarged view of the apparatus shown in Fig. 1, with certain parts in section, and Fig. 3 a diagrammatic view of another form of car air brake equipment with my invention applied, also connected to a water raising apparatus.

The air brake equipment, as illustrated in Fig. 1, comprises a train pipe 1, connected by branch pipe 2 with a triple valve device 3, which is connected by pipes 4 and 5 respectively to the auxiliary reservoir 6 and the supplemental reservoir 7, and is also connected to the brake cylinder 8. According to this application of my invention, a fluid pressure supply pipe 9, connected to a water tank 10 opens into pipe 5 to the supplemental reservoir 7. The pipe 9 contains a pressure control valve 11, a reducing valve 12, and hand valve 13.

In the form of triple valve device, shown in Fig. 2, the supplemental reservoir 7 is connected by pipe 5 to passage 14 opening to the seat of the main slide valve 15. In full release position, this passage 14 is open through port 17 in the main valve 15 to the valve chamber and the auxiliary reservoir as usual in constructions of this type. In full release position of the triple valve piston 16 a port 17 in the main slide valve 15, opening into the main valve chamber and auxiliary reservoir, registers with passage 14, so that fluid from the train pipe flows through the usual feed groove around the triple valve piston 16 to the valve chamber and through port 17, passage 14, and pipe 5 to the supplemental reservoir and also through pipe 9 to the cut out valve mechanism 11. When the pressure in the reservoir 7 and pipe 9 has attained the degree for which the spring 18 of said valve mechanism is adjusted, which may be, say, 60 pounds, the diaphragm 19 opens the valve 20 and fluid under pressure flows to the supply reservoir 23, charging same to the pressure carried in the system. As required, fluid may then be drawn from the supplemental reservoir 23 through reducing valve 12 adjusted to the degree desired in the water tank 10, which is usually about 20 pounds. When the train pipe pressure is reduced for the purpose of making an application of the brakes, the preliminary movement of the piston shifts the auxiliary slide valve 21 on the main slide valve 15, and closes the port 17. Further flow of fluid from the auxiliary reservoir to passage 14 and the pipe 9 leading to the extraneous fluid pressure apparatus is thus cut off. It will now be apparent that the supply pipe 9 to the extraneous apparatus is cut off by the preliminary movement of the triple piston, so that the auxiliary reservoir pressure is only subject to reduction due to the usual braking operations.

According to the construction illustrated in Fig. 3, my invention is shown as applied to an air brake equipment wherein the usual standard triple valve 24 is employed. In this case the pipe 9 leads to a passage 22 opening to the seat of the main slide valve 25 so that on preliminary movement of the triple piston 26 and main slide valve 25 from full release position, communication is cut off by said main valve between the passage 22 and the auxiliary reservoir from which it will be seen that fluid from the auxiliary reservoir is prevented from flowing to the pipe 9 as in the first described construction.

It will thus be apparent, that my improvements may be applied to various types of triple valve devices and that the flow of air will be cut off to the extraneous apparatus, by the automatic operation of the triple valve, so that the braking operations thereof, will not be interfered with.

Having now described my invention, what I claim as new and desire to secure by Letters Patent, is:—

1. In a fluid pressure brake system, the combination with a train pipe, triple valve, auxiliary reservoir and brake cylinder, of an extraneous apparatus adapted to utilize fluid under pressure from said brake system, and fluid pressure operated means for controlling communication from the auxiliary reservoir to said apparatus.

2. In a fluid pressure brake system, the combination with a train pipe, triple valve, auxiliary reservoir and brake cylinder, of an extraneous apparatus adapted to utilize fluid under pressure from said brake system, and means subject to variations in train pipe pressure for controlling communication from the auxiliary reservoir to said apparatus.

3. In a fluid pressure brake system, the combination with a train pipe, triple valve, auxiliary reservoir and brake cylinder, of an extraneous apparatus adapted to utilize fluid under pressure from said brake system, and means operating upon a reduction in train pipe pressure for closing communication from the auxiliary reservoir to said apparatus.

4. In a fluid pressure brake system, the combination with a train pipe, auxiliary reservoir and brake cylinder, of an extraneous apparatus adapted to utilize fluid under pressure from said brake system, and a triple valve device adapted to control communication between the auxiliary reservoir and said apparatus, and operating upon a reduction in train pipe pressure to close said communication.

5. In a fluid pressure brake system, the combination with a train pipe, auxiliary reservoir, brake cylinder and supplemental reservoir, of an extraneous apparatus adapted to utilize fluid under pressure derived from the auxiliary reservoir and supplemental reservoir, and means operated upon a variation in train pipe pressure to close communication between the auxiliary reservoir and said extraneous apparatus.

6. In a fluid pressure brake system, the combination with a train pipe, auxiliary reservoir, brake cylinder and supplemental reservoir, of an extraneous apparatus adapted to utilize fluid under pressure derived from the auxiliary reservoir and the supplemental reservoir, and a triple valve device having a main slide valve adapted to establish communication from the auxiliary reservoir to the supplemental reservoir and said extraneous apparatus in full release position, and actuated under a reduction in train pipe pressure to close said communication.

7. In a fluid pressure brake system, the combination with a train pipe, auxiliary reservoir and brake cylinder, of an extraneous apparatus adapted to utilize fluid under pressure from said auxiliary reservoir, and a triple valve device having a main slide valve adapted to establish communication between the auxiliary reservoir and said extraneous apparatus, an actuating piston and an auxiliary valve, having a movement relative to said main valve, said piston and auxiliary valve being actuated upon a variation in train pipe pressure to close said communication from the auxiliary reservoir to said extraneous apparatus.

8. In a fluid pressure brake system, the combination with a train pipe, auxiliary reservoir and brake cylinder, of an extraneous apparatus adapted to utilize fluid under pressure from said auxiliary reservoir, and a triple valve device comprising a main slide valve adapted to establish communication between the auxiliary reservoir and said extraneous apparatus, in one position, an actuating piston and an auxiliary valve, having a movement relative to the main valve, said piston and auxiliary valve being actuated upon a reduction in train pipe pressure to close said auxiliary reservoir communication to the extraneous apparatus.

9. In a fluid pressure brake system, the combination with a train pipe, triple valve, auxiliary reservoir, and brake cylinder, of extraneous apparatus adapted to be supplied with air from the brake system through the auxiliary reservoir and means for cutting off said supply of air upon applying the brakes.

10. In a fluid pressure brake system, the combination with an extraneous apparatus adapted to receive air from the brake system, of means for cutting off the supply of air to said apparatus upon applying the brakes.

11. In a fluid pressure brake system, the combination with a device for utilizing fluid under pressure carried in the brake system, of means operating according to variations in train pipe pressure for controlling communication from the brake system to said device.

12. In a fluid pressure brake system, the combination with a train pipe, auxiliary reservoir, and brake cylinder, of an apparatus adapted to be operated by fluid from the brake system and a triple valve device having means for controlling the admission of fluid to said apparatus.

In testimony whereof I have hereunto set my hand.

WALTER V. TURNER.

Witnesses:
R. F. EMERY,
WM. M. CADY.